United States Patent
Cazaux et al.

(10) Patent No.: US 11,852,479 B2
(45) Date of Patent: Dec. 26, 2023

(54) SYSTEM AND METHOD FOR MANAGING THE DISPLAY OF AN AERONAUTICAL CHART

(71) Applicant: THALES, Courbevoie (FR)

(72) Inventors: Patrick Cazaux, Merignac (FR); Dominique Leurgorry, Merignac (FR); Hervé Leconte, Merignac (FR)

(73) Assignee: THALES, Courbevoie (FR)

(*) Notice: Subject to any disclaimer, the term of this patent is extended or adjusted under 35 U.S.C. 154(b) by 436 days.

(21) Appl. No.: 17/355,116

(22) Filed: Jun. 22, 2021

(65) Prior Publication Data
US 2021/0404810 A1 Dec. 30, 2021

(30) Foreign Application Priority Data
Jun. 30, 2020 (FR) ...................................... 2006864

(51) Int. Cl.
*G01C 17/38* (2006.01)
*G01C 21/20* (2006.01)
*G06F 3/01* (2006.01)

(52) U.S. Cl.
CPC ............. *G01C 17/38* (2013.01); *G01C 21/20* (2013.01); *G06F 3/016* (2013.01)

(58) Field of Classification Search
None
See application file for complete search history.

(56) References Cited

U.S. PATENT DOCUMENTS

| | | | | |
|---|---|---|---|---|
| 7,756,629 B2 * | 7/2010 | Aspen | .................... | G01C 23/00 701/460 |
| 8,797,278 B1 * | 8/2014 | Lutz | ..................... | G09B 29/003 345/173 |
| 9,235,267 B2 | 1/2016 | Burrough et al. | | |
| 9,280,904 B2 * | 3/2016 | Bourret | ................ | G08G 5/0021 |
| 9,347,791 B2 * | 5/2016 | Sia | ..................... | G01C 21/3664 |
| 9,710,145 B2 * | 7/2017 | Zammit-Mangion | ........................ | B64D 43/02 |
| 9,939,271 B1 | 4/2018 | Foster et al. | | |
| 10,464,688 B2 * | 11/2019 | Monvoisin | ............. | G01C 23/00 |

(Continued)

FOREIGN PATENT DOCUMENTS

| | | |
|---|---|---|
| EP | 2 461 233 A1 | 6/2012 |
| EP | 3 315 916 A1 | 5/2018 |
| WO | 03/005326 A1 | 1/2003 |

OTHER PUBLICATIONS

Kurtz, "Google Earth, Compass, View, and Scale Controls", Youtube, https://www.youtube.com/watch?v=RMOpRTJ3dAY, May 5, 2014.

(Continued)

*Primary Examiner* — Christopher W Fulton
(74) *Attorney, Agent, or Firm* — BakerHostetler

(57) ABSTRACT

Methods and systems for managing the orientation of the display of an aeronautical chart, notably towards Magnetic North or True North are provided. Rotational and/or translational tactile movements may manage the display of the chart. In one advantageous embodiment, the display screen is a haptic feedback screen (for example piezoelectric or MEMS microactuators), the North symbol rendered in relief is able to be manipulated with a single finger and the display device is stabilized by at least partially compensating for the turbulence experienced by the cockpit. Some software aspects are described.

15 Claims, 3 Drawing Sheets

(56) References Cited

U.S. PATENT DOCUMENTS

| | | | |
|---|---|---|---|
| 10,540,903 B2 * | 1/2020 | Kneuper | G08G 5/0047 |
| 11,157,135 B2 * | 10/2021 | Kocienda | G06F 3/04817 |
| 11,481,100 B2 * | 10/2022 | Lyons | G04G 13/02 |
| 2012/0182241 A1 * | 7/2012 | Molino | G06F 3/0488 |
| | | | 345/173 |
| 2014/0365934 A1 | 12/2014 | Moore et al. | |
| 2015/0169064 A1 * | 6/2015 | Lafon | G06F 3/0482 |
| | | | 345/161 |

OTHER PUBLICATIONS

Bernard, "Design, manufacture and characterization of a piezoelectric microactuator-based haptic pad", Doctoral thesis, Grenoble, (2016).

* cited by examiner

SYSTEM AND METHOD FOR MANAGING THE DISPLAY OF AN AERONAUTICAL CHART

CROSS-REFERENCE TO RELATED APPLICATIONS

This application claims priority to foreign French patent application No. FR 2006864, filed on Jun. 30, 2020, the disclosure of which is incorporated by reference in its entirety.

FIELD OF THE INVENTION

The invention relates to the technical field of human/machine interfaces, and more particularly proposes systems and methods for managing the display of an aeronautical chart.

BACKGROUND

In an aircraft (for example plane, helicopter, etc.), what is called the "navigation" interface depicts the situation of the aircraft in space, in two dimensions (2D), seen from above. During operation, this type of display may be complex to read. The display may also need to be adjusted by the user, in particular so as to (re)orient the chart.

Modern navigation screens generally allow the orientation to be man-aged in 3 modes: 1) along the axis defined by the aircraft ("heading"); 2) along its axis and its drift ("track"); and 3) orientation towards North. Each of these three orientation modes may be processed with respect to Magnetic North or to True North. In each of these modes, there is also a graduated circular depiction of the orientations (called "graduated circular symbol" in this document).

These depiction modes have the advantage of being well known in aeronautical cockpits, but have multiple drawbacks. They do not allow the chart to be oriented along a precise orientation desired by the user and the change of orientation to or from North-oriented mode generally takes place abruptly or in jolts, and often leads to a jump or a display discontinuity (disruptive to the user).

The scientific literature and the patent literature describe few satis-factory solutions.

There is a need for advanced viewing systems and methods.

SUMMARY OF THE INVENTION

The document describes methods and systems for managing the display of an aeronautical chart, notably the orientation towards Magnetic North or True North. Rotational and/or translational tactile movements may manage the display of the chart. In one advantageous embodiment, the display screen is a haptic feedback screen (for example piezoelectric or MEMS microactuators), the North symbol rendered in relief is able to be manipulated with a single finger and the display device is stabilized by at least partially compensating for the turbulence experienced by the cockpit. Some software aspects are described.

The document discloses examples of methods and of systems for intuitively, quickly and accurately modifying the orientation of an aeronautical navigation chart.

In one embodiment, the method comprises the step of manipulating a (physical and/or logical) interactor, for example placed on the Cardinal North point.

This implementation has multiple advantages that are described below.

Advantageously, the methods and systems according to the invention allow charts or cartographic backgrounds to be manipulated intuitively, quickly and reliably. This manipulation may notably be performed with a single finger, the cursor or symbol associated with Geographical North or True North being displayed "in relief", the display also being stabilized.

Advantageously, the pilot's finger does not have to follow the circular symbol. The entire screen may be used.

The manipulation is advantageously natural and intuitive: the user may have the impression of directly turning the pointer on a dial.

Advantageously, the manipulation is effective in the avionic environment: it may be both fast (particularly when bringing the finger/cursor towards the centre) and accurate (particularly when moving the finger/cursor away from the centre).

To obtain the desired results, what is proposed is a computer-implemented method for managing the display of an aeronautical chart in a display device in an aircraft cockpit, the method comprising the steps of:

receiving, on a screen of a display device in an aircraft cockpit displaying an aeronautical chart and a graduated circular depiction of the orientations, activation information for a selectable interactor, said activated interactor being superimposed on the graduated circular depiction of the orientations at an initial position;

identifying, in accordance with one or more interactions on the screen, a selection action from among a plurality of predefined selection actions, the selection action defining a final position;

moving said activated interactor on the screen, to a position given by an axis going from the centre of the graduated circular depiction of the orientations to said final position; and reconfiguring the display of the aeronautical chart on the basis of the movement performed.

According to some alternative or combined embodiments:

the step of identifying a selection action consists in determining whether the action corresponds to an axial or rotational movement on said screen between an initial position and a final position.

the step of moving said interactor consists in bringing the interactor onto the graduated circular depiction at a position given by an axis going from the centre of the graduated circular depiction to the final position of the axial or rotational movement.

the method furthermore comprises a step of receiving an indication of the end of movement of said interactor so as to trigger the reorientation of the chart.

the method furthermore comprises a step of scaling the aeronautical chart on the basis of the movement of said interactor.

the scaling follows a non-linear law as a function of the movement of said interactor the interactor is depicted at least partially in relief, and the display screen is a haptic feedback screen.

the display device is stabilized by at least partially compensating for the vibrations of the cockpit, notably the vibrations caused by turbulence.

The invention also covers a computer program product comprising code instructions for performing the steps of the claimed method when the program is executed on a computer.

The invention additionally covers a system for managing the display of an aeronautical chart in a display device in an aircraft cockpit, said system comprising means for:

receiving, on a screen of a display device in an aircraft cockpit displaying an aeronautical chart and a graduated circular depiction of the orientations, activation information for a selectable interactor, said activated interactor being superimposed on the graduated circular depiction of the orientations at an initial position;

identifying, in accordance with one or more interactions on the screen, a selection action from among a plurality of predefined selection actions, the selection action defining a final position;

moving said activated interactor on the screen, to a position given by an axis going from the centre of the graduated circular depiction of the orientations to said final position; and reconfiguring the display of the aeronautical chart on the basis of the movement performed.

According to some alternative or combined embodiments:

the screen is a haptic feedback touch screen and said interactor is depicted at least partially in relief.

the haptic feedback touch screen comprises piezoelectric microactuators and/or MEMS microactuators.

the display device furthermore comprises a virtual-reality and/or augmented-reality headset and a gaze-tracking pointing device.

the interactor is able to be controlled by an input peripheral, selected from the group comprising: computer mouse, touch pad, force feedback pad, rotator, trackball, one or more micro joysticks, touch bar.

the system furthermore comprises a display stabilization device for at least partially compensating for the vibrations of the cockpit, notably the vibrations caused by turbulence.

BRIEF DESCRIPTION OF THE DRAWINGS

Other features and advantages of the invention will become apparent with the aid of the following description and the figures of the appended drawings, in which.

DETAILED DESCRIPTION

According to the embodiments of the invention, an "aircraft" may be a drone, or a commercial plane, or a freight plane, or else even a helicopter carrying or not carrying passengers, or any element able to be piloted remotely (via radio link, satellite or the like), at least in part (intermittently, or periodically, or even opportunistically over time).

The term "interactor" may be replaced with "object", "symbol", "surface", "point", "actuator". The interactor may be diverse in nature: both physical (for example rotator, input peripheral used in combination with touch, haptic feedback screen) and logical (symbol whose depiction may evolve over time depending on whether it is preselected, selected, activated, deactivated, terminated, opened, closed, etc.).

Figure 1:
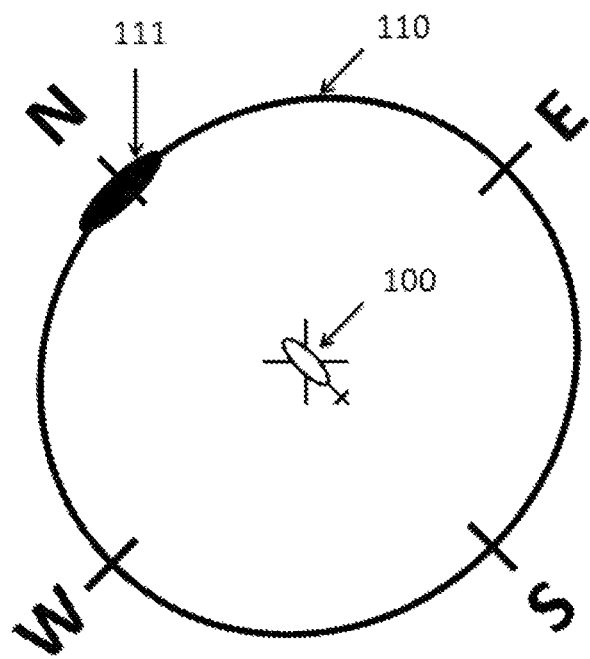
FIG. 1 illustrates one exemplary embodiment in a first state.

FIG. 1 illustrates one exemplary embodiment in a first state for a "heading"-oriented chart with an interactor depicted on the North. The chart is said to be "heading up"-oriented with an aircraft oriented towards the top of the figure. The chart is displayed on a screen of a display device in an aircraft cockpit.

The aircraft is depicted by a symbol 100, which is in the centre of a graduated circular depiction of the orientations 110. An interactor 111 (for example surface, rectangle, oval, etc.) is superimposed on the graduated circular depiction of the orientations 110 and is arranged close to, that is to say "underneath, on, next to, near, etc." the North N. The North may be True North or Magnetic North.

In one development, the interactor is depicted at least partially in relief, and the display screen is a haptic feedback screen. Advantageously, the symbol is able to be manipulated with a single finger.

In one development, the display device is stabilized by at least partially compensating for the vibrations of the cockpit, notably the vibrations caused by turbulence. For example, accelerometers may measure the vibrations in the cockpit in general and of the display device in particular, and these vibrations may be mechanically compensated for via actuators (practically in real time). Other stabilization mechanisms are possible (pneumatic ones, electric ones, etc.).

Figure 2:
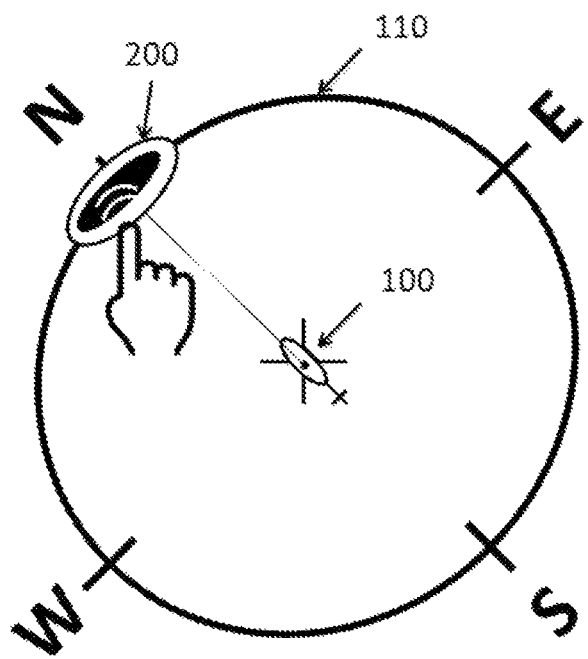
FIG. 2 illustrates one exemplary embodiment in a second state.

FIG. 2 illustrates one exemplary embodiment in a second state. When a user interacts on the screen of a display device displaying an aeronautical chart with the interactor 111, that is to say when he presses, touches, clicks on, shows or selects the interactor in another way, activation information for a selectable interactor is received.

Upon receiving the activation information, the depiction of the interactor changes, such as for example so as to become a shape of a surrounded symbol 200. Other implementations are possible, for example active selection indicator light, etc.

Thus, by activating the selectable interactor via a touch input or via a cursor designator, the interactor changes depiction 200.

The depiction of the activated interactor allows the user to perform interactions on the screen corresponding to predefined selection actions. According to some embodiments, the depiction may indicate one or more states selected from among a locked symbol, a symbol able to be moved in one or more directions in space, an active or inactive symbol, a symbol awaiting interaction, a symbol with options (for example long press), etc. The depiction of the symbol may therefore invite the interaction, and present or offer various options.

According to some embodiments, the predefined selection actions may correspond to actions of moving between an initial position and a final position, a movement possibly being an axial or rotational movement on the screen.

The method of the invention makes it possible to identify which selection action on the screen is performed from among a plurality of predefined selection actions.

In one embodiment of the invention, the depiction of the aircraft 100 may also provide one or more indications about interactions able to be performed, for example with left-to-right arrows.

Figure 3A:
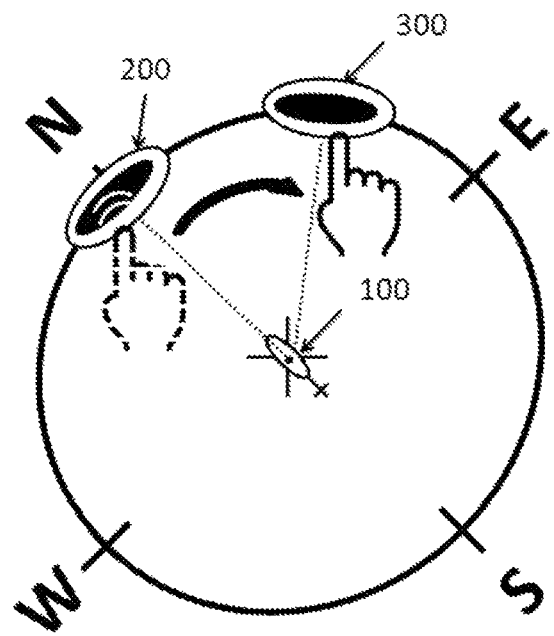
FIGS. 3a and 3b illustrate two exemplary embodiments in a third state.
Figure 3B:
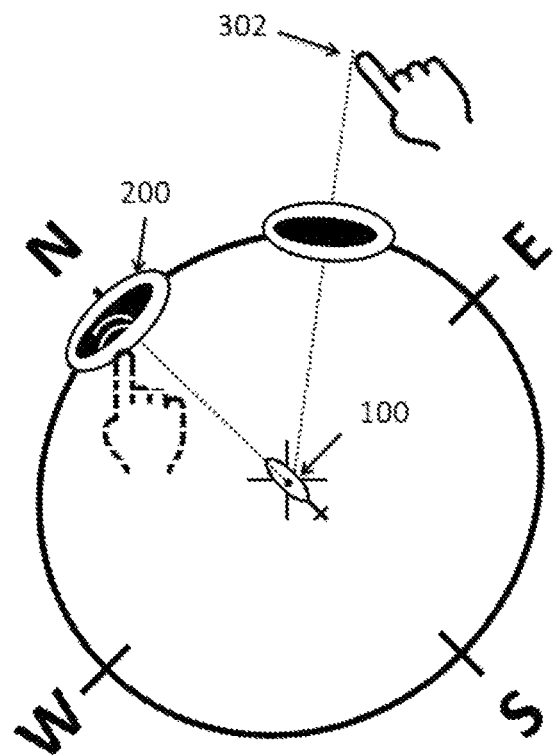

FIGS. 3a and 3b illustrate two exemplary embodiments in a third state. The symbol 200 of the activated interactor may be moved between an initial position and a final position (300, 302).

A circular movement, as illustrated in FIG. 3a, consists in following the graduated circular depiction of the orientations in a clockwise or anticlockwise direction. The symbol 200 of the activated interactor is positioned on the graduated circular depiction of the orientations at a position given by an axis going from the centre of the graduated circular depiction to the final position 300 of the movement.

A translational movement, as illustrated in FIG. 3*b*, may consist in taking a path to any point of the screen, or may consist in designating an arrival point 302. The symbol 200 of the activated interactor is positioned at a position given by an axis going from the centre of the graduated circular depiction to the final position 302 of the movement.

There may be various techniques for moving on the screen (usual mode of interaction on a touch screen): for example drag-and-drop ("press and maintain", "slide and release", "drag and drop", etc.) in a circular manner (for example along the graduated circular symbol) and/or in translation (i.e. everywhere else on the screen, the variable radius being for example linearly proportional to the scale of the underlying chart).

In one embodiment, only circular movements are expected and/or performed.

In one optional embodiment, if the user increases the radius (for example translational movements), the scale of the chart increases, and vice versa.

In one embodiment, the user may combine a circular movement with a translation, this having the effect of reorienting the chart and of performing a scale change.

Figure 4:
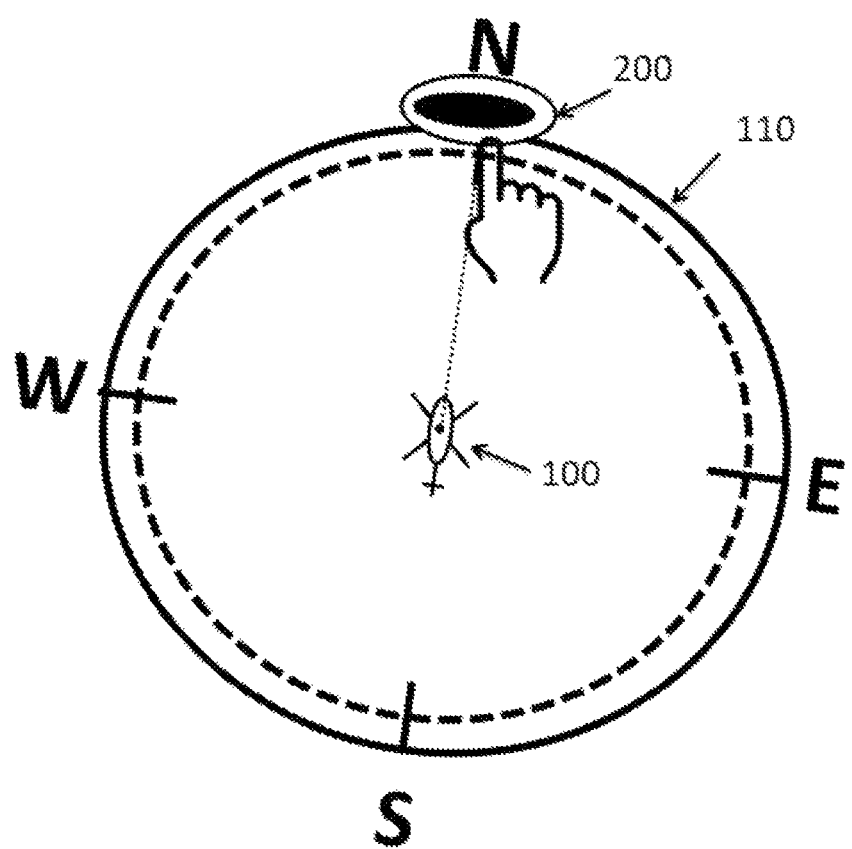
FIG. 4 illustrates one exemplary embodiment in a fourth state.

FIG. 4 illustrates one exemplary embodiment in a fourth state when or after the user has selected an arrival location. The arrival location designated by the user may designate North (True North or Magnetic North as the case may be).

The method of the invention makes it possible to change the orientation of the chart on the basis of the movement performed.

In one embodiment, the radius of the graduated circular depiction may be changed. For example, the radius variation may be linearly proportional to the scale of the chart. In other embodiments, refined or non-linear functions may be used.

In one embodiment, the change in orientation of the chart is conditional on initially manipulating the interactor according to the invention. In other words, manipulating any point on the screen does not necessarily lead to a change on the chart. This embodiment has the advantage of making the manipulation of the screen specific to just one or more locations (for example, there may be an absolute return of the interactor in addition to the relative position of the aircraft that is illustrated).

In another embodiment, the method according to the invention may guarantee that manipulating any point of the screen (except for the depictions of the interactor 111) does not lead to manipulation of the underlying chart. In other words, the possibility of manipulating the chart by way of the interaction with the activated symbol 200 alone may be guaranteed positively (action on the only symbol) and/or but also negatively (that is to say by preventing, forbidding or stopping any modification of the orientation that might be requested based on points other than the symbol 200).

This change in orientation may for example consist in orienting the interactor along the axis going from the centre of the graduated circular symbol to the position of the finger at the arrival location.

In one embodiment, the action of the user on the displayed symbol may be the condition for the graphical modifications. For example, as a function of one or more presses on the symbol (for example total number of times or sequence of short and long presses), the method according to the invention may comprise the step of triggering a predefined graphical modification. For example, a double press ("double-tap") may cause the display to change to a predefined mode; N consecutive presses (with predefined temporal tolerances and rules) may cause the display to toggle to North N mode.

In particular, in one embodiment, one or more presses on the symbol at the arrival position may trigger the activation of the abovementioned modes (i.e. "heading", "track", orientation towards North). From a cognitive perspective, pilots are used to these display modes, and it is therefore advantageous to use them in combination in the embodiments of the invention.

In one embodiment, a double-press (or double-click) action on the interactor makes it possible to change the chart to North-oriented mode. This same action on the plane symbol makes it possible to return to the last orientation mode used (for example out of "heading" and "track"). The actions may specifically be directed towards reference elements in the orientation of the chart (North or the plane).

In one embodiment, the method makes it possible to determine the end of the movement of the interactor so as to trigger the reorientation of the chart. An end of movement indication may consist of a "double-tap", right click or release action, for example. The displayed chart is then reconfigured (i.e. the display of the chart is reconfigured, for example in accordance with the chosen scale and the location of North).

In one embodiment, optional visual effects may allow a smooth or even direct visual transition (depending on the configurations).

Touch Screen

In one embodiment, the display screen is a touch screen (for example capacitive or the like). Modern technologies allow this screen to be formed flat, but also in the form of a curve or in curved or flexible form.

In one embodiment, the display screen results from a tangible display (for example OLED, AMOLED, etc.) combined with a projector (for example pico-projector, laser projector, etc.).

Haptic Feedback (Touch) Screen

In one embodiment, the display screen is not just a touch screen, but also has sensory or haptic feedback.

A haptic device is a possibly robotic physical or mechanical tactile-kinaesthetic system that is able notably to create communication between a human and a portion of his surroundings.

It allows users to design, model and manipulate objects in a virtual environment with a certain tactile sensation (touch) and/or kinaesthetic perception (force feedback).

Published patent documents EP2461233 or U.S. Pat. No. 9,235,267 describe methods and systems that are able to be used in the context of the invention. It is possible to achieve or approximate sensations of objects in relief (for example button, stop, rail, obstacle, etc.) or actions (for example clicking sensations) through vibrations at appropriate frequencies. Multiple technologies may be used to form the display pad (for example piezoelectric microactuators, MEMS, etc.). Cf. Bernard (2016) *Conception, fabrication et caractérisation d'une dalle haptique à base de micro-actionneurs piézoélectriques* [*Design, manufacture and characterization of a piezoelectric microactuator-based haptic pad*] (Doctoral thesis, Grenoble).

In particular, it may be advantageous to form the interactor 111 in a "three-dimensional" manner or in "relief" (i.e. with a non-zero asperity), since the sensation of axial and/or rotational movement with a prehensile object makes the operation intuitive and reduces errors.

In an environment that may be subject to turbulence, this embodiment is particularly advantageous in terms of sensation (for example stop, resistance, particular nature of the object, etc.) and operational reliability.

Input Peripherals

As an alternative or in addition, it is possible to perform the steps described in this document with physical devices (for example keyboard, mouse, pad, micro joystick, rotator, touch bar, etc.).

In one embodiment, the method is computer-implemented. By way of example of hardware architecture appropriate for implementing the invention, a device may include a communication bus to which a central processing unit (CPU) or microprocessor are connected, which processor may be "multicore" or "manycore"; a read-only memory (ROM) able to contain the programs necessary for implementing the invention; a random access memory (RAM) or cache memory containing registers suitable for recording variables and parameters that are created and modified during the execution of the abovementioned programs; and an I/O ("input/output") or communication interface suitable for transmitting and for receiving data. If the invention is implanted in a reprogrammable computing machine (for example an FPGA circuit), the corresponding program (that is to say the sequence of instructions) may be stored in or on a storage medium that is removable (for example an SD card or a mass storage means, such as a hard disk, for example an SSD) or that is non-removable, that is volatile or non-volatile, this storage medium being readable in part or in full by a computer or a processor. The reference to a computer program that, when it is executed, performs any one of the previously described functions is not limited to an application program running on a single host computer. On the contrary, the terms computer program and software are used here in a general sense to refer to any type of computer code (for example, application software, firmware, microcode, or any other form of computer instruction, such as web services or SOA or via programming interfaces API) that may be used to program one or more processors so as to implement aspects of the techniques described here. The computing means or resources may notably be distributed ("cloud computing"), possibly with or using peer-to-peer and/or virtualization technologies. The software code may be executed on any suitable processor (for example a microprocessor) or processor core or a set of processors, whether these are provided in a single computing device or distributed between several computing devices. Security technologies (cryptoprocessors, possibly biometric authentication, encryption, chip card, etc.) may be used.

The invention claimed is:

1. A computer-implemented method for managing the display of an aeronautical chart in a display device in an aircraft cockpit, the method comprising the steps of:
receiving, on a screen of a display device in an aircraft cockpit displaying an aeronautical chart and a graduated circular depiction of the orientations, activation information for a selectable interactor, said activated interactor being superimposed on the graduated circular depiction of the orientations at an initial position;
identifying, in accordance with one or more interactions on the screen, a selection action from among a plurality of predefined selection actions, the selection action defining a final position;
moving said activated interactor on the screen, to a position given by an axis going from the centre of the graduated circular depiction of the orientations to said final position; and
reconfiguring the display of the aeronautical chart on the basis of the movement performed.

2. The method according to claim 1, wherein the step of identifying a selection action consists in determining whether the interaction on the screen corresponds to an axial or rotational movement between the initial position and the final position.

3. The method according to claim 2, wherein the step of moving said activated interactor consists in bringing the interactor onto the graduated circular depiction at a position given by an axis going from the centre of the graduated circular depiction of the orientations to said final position of the axial or rotational movement.

4. The method according to claim 1, furthermore comprising a step of receiving an indication of the end of movement of said interactor so as to trigger the reorientation of the chart.

5. The method according to claim 1, wherein the reconfiguration step consists in scaling the aeronautical chart on the basis of the movement of said interactor.

6. The method according to claim 5, wherein the scaling follows a non-linear law as a function of the movement of said interactor.

7. The method according to claim 1, wherein said activated interactor is depicted at least partially in relief, and wherein the display screen is a haptic feedback screen.

8. The method according to claim 1, wherein the display device is stabilized by at least partially compensating for the vibrations of the cockpit, notably the vibrations caused by turbulence.

9. A computer program product, said computer program comprising code instructions for performing the steps of the method according to claim 1 when said program is executed on a computer.

10. A system for managing the display of an aeronautical chart in a display device in an aircraft cockpit, said system comprising means for:
receiving, on a screen of a display device in an aircraft cockpit displaying an aeronautical chart and a graduated circular depiction of the orientations, activation information for a selectable interactor, said activated interactor being superimposed on the graduated circular depiction of the orientations at an initial position;
identifying, in accordance with one or more interactions on the screen, a selection action from among a plurality of predefined selection actions, the selection action defining a final position;
moving said activated interactor on the screen, to a position given by an axis going from the centre of the graduated circular depiction of the orientations to said final position; and
reconfiguring the display of the aeronautical chart on the basis of the movement performed.

11. The system according to claim 10, wherein the screen is a haptic feedback touch screen and wherein said interactor is depicted at least partially in relief.

12. The system according to claim 11, wherein the haptic feedback touch screen comprises piezoelectric microactuators and/or MEMS microactuators.

13. The system according to claim 10, wherein the display device furthermore comprises a virtual-reality and/or augmented-reality headset and a gaze-tracking pointing device.

14. The system according to claim 10, wherein said interactor is able to be controlled by an input peripheral, selected from the group comprising: computer mouse, touch pad, force feedback pad, rotator, trackball, one or more micro joysticks, touch bar.

15. The system according to claim 10, furthermore comprising a display stabilization device for at least partially compensating for the vibrations of the cockpit, notably the vibrations caused by turbulence.

* * * * *